United States Patent [19]

Sasaki et al.

[11] Patent Number: 4,499,459
[45] Date of Patent: Feb. 12, 1985

[54] DRIVE CIRCUIT FOR DISPLAY PANEL HAVING DISPLAY ELEMENTS DISPOSED IN MATRIX FORM

[75] Inventors: Minoru Sasaki, Tokyo; Toshiharu Kamiya, Yokohama, both of Japan

[73] Assignee: Tokyo Shibaura Denki Kabushiki Kaisha, Kawasaki, Japan

[21] Appl. No.: 428,302

[22] Filed: Sep. 29, 1982

[30] Foreign Application Priority Data

Oct. 29, 1981 [JP] Japan .................................. 56-173259
Oct. 29, 1981 [JP] Japan .................................. 56-173260

[51] Int. Cl.³ ............................................ G09G 3/29
[52] U.S. Cl. ................................. 340/752; 340/784; 340/789; 340/811; 350/333
[58] Field of Search ............... 340/752, 784, 802, 754, 340/768, 798, 800, 811, 789, 801; 350/332, 333

[56] References Cited

U.S. PATENT DOCUMENTS

| | | | |
|---|---|---|---|
| 3,975,085 | 8/1976 | Yamada et al. | 340/784 |
| 4,231,640 | 11/1980 | Funada et al. | 340/784 |
| 4,346,378 | 8/1982 | Shanks | 340/784 |

*Primary Examiner*—Gerald L. Brigance
*Attorney, Agent, or Firm*—Oblon, Fisher, Spivak, McClelland & Maier

[57] ABSTRACT

First and second drive circuits for sequentially applying drive signals to data lines of a display panel are provided at opposite sides of the display panel. The first and second drive circuits each have a bidirectional shift register for producing sequential scanning pulses which is switched in its data shifting direction in accordance with a control signal. The first and second drive circuits are set reversely in the drive signal generating sequence at their outputs. According to this configuration, the first and second drive circuits can be constructed of the same circuit arrangement, and the necessity of crossing wires between either one of the first and second drive circuits and the display panel can be obviated.

5 Claims, 10 Drawing Figures

DRIVE CIRCUIT FOR DISPLAY PANEL HAVING DISPLAY ELEMENTS DISPOSED IN MATRIX FORM

BACKGROUND OF THE INVENTION

The present invention relates to a display device for displaying characters or pictures by employing a display panel in which display elements such as liquid crystal are arrayed in a matrix form and, more particularly, to an improvement in a drive circuitry thereof.

A matrix type liquid crystal display device is known for displaying characters or television picture. This display device has a display panel which has liquid crystal display elements arranged in a matrix form, address and data lines, and drive circuits which sequentially scan the address lines and sequentially distribute picture data to the data lines. In such a display device, when a large number of data lines are required, it is difficult to construct the drive circuit for distributing picture data by a single integrated circuit due to the restriction in the number of outputs and in the layout. Therefore, in a conventional display device, the picture-signal distributing drive circuit is divided to be disposed at both sides of the display panel so that odd- and even-numbered data lines or left- and right-hand half data lines are driven by separate drive circuits.

The data lines of the display panel should be sequentially driven in its array direction. If the data line drive circuits disposed at both sides of the display panel have the same circuit arrangement and thus the sequence of generating the drive signals (picture data) at their output terminals are identical, then wires between the output terminals of one of the drive circuits and the data lines cross each other, which causes difficulty in manufacturing the display device. The provision of two types of drive circuits which sequentially generate drive signals in reverse sequence will simplify the wiring, but this causes an increase in manufacturing cost.

SUMMARY OF THE INVENTION

It is an object of the present invention to provide a display device in which drive circuits disposed at opposite sides of a display panel can be commonly constructed and yet the wiring between one of the drive circuits and the display panel can be simplified.

It is another object of the present invention to provide a display device which is capable of reducing power dissipation of the drive circuits.

In order to achieve the first object of this invention, each of the drive circuits is composed of a bidirectional shift register and the data shifting directions of the bidirectional shift registers of the drive circuits are set opposite to each other by a control signal.

In order to achieve the second object, each of the drive circuits is composed of a plurality of blocks of bidirectional shift registers, and a data input pulse and data-shifting clock pulses are applied to a plurality of register blocks in different periods of time.

DETAILED DESCRIPTION OF THE PREFERRED EMBODIMENTS

Figure 1:
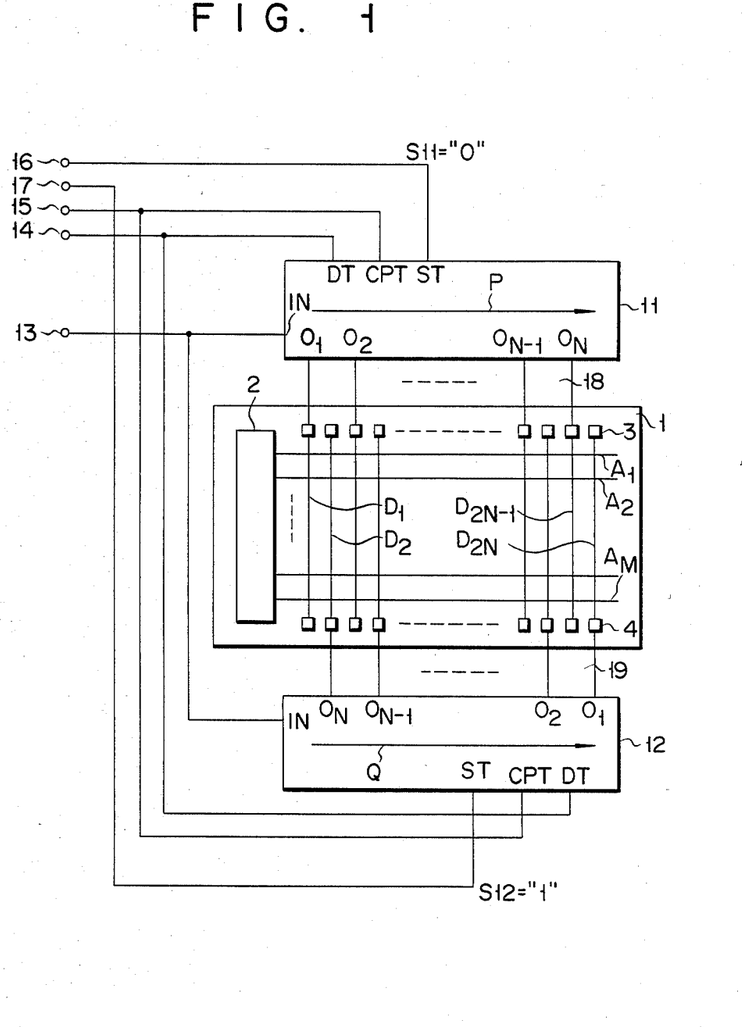
FIG. 1 schematically shows a display device according to an embodiment of the present invention.

FIG. 1 shows an embodiment of the present invention. In FIG. 1, reference numeral 1 designates a display panel which has liquid crystal display elements arranged in a matrix form. Address lines $A_1$ to $A_M$ and data lines $D_1$ to $D_{2N}$ are arranged so as to sandwich respective liquid crystal display elements. Address lines $A_1$ to $A_M$ are connected to a vertical scanning drive circuit 2 which is composed of shift registers, and are thus sequentially supplied with scanning pulses from above to below to be vertically scanned. Data lines $D_1$ to $D_{2N}$ are respectively connected at both ends to terminals 3 and 4 disposed at both upper and lower edges of display panel 1.

Picture-data distributing drive circuits 11 and 12 are respectively disposed at upper and lower sides of display panel 1 to supply picture data through terminals 3 and 4 to data lines $D_1$ to $D_{2N}$. Drive circuits 11 and 12 each have N output terminals $O_1$ to $O_N$, a half of the number 2N of the data lines. Outputs $O_1$ to $O_N$ of drive circuit 11 are respectively connected to odd-numbered data lines $D_1, D_3, \ldots, D_{2N-1}$ through terminals 3, while outputs $O_N$ to $O_1$ of drive circuit 12 are respectively connected to even-numbered data lines $D_2, D_4, \ldots, D_{2N}$. Drive circuits 11 and 12 each comprise, in addition to outputs $O_1$ to $O_N$, a picture-data input terminal IN, a data pulse input terminal DT, a clock (shift) pulse input terminal CPT and a control signal input terminal ST. Drive circuits 11 and 12 each have a circuit arrangement shown in FIG. 2.

Figure 2:
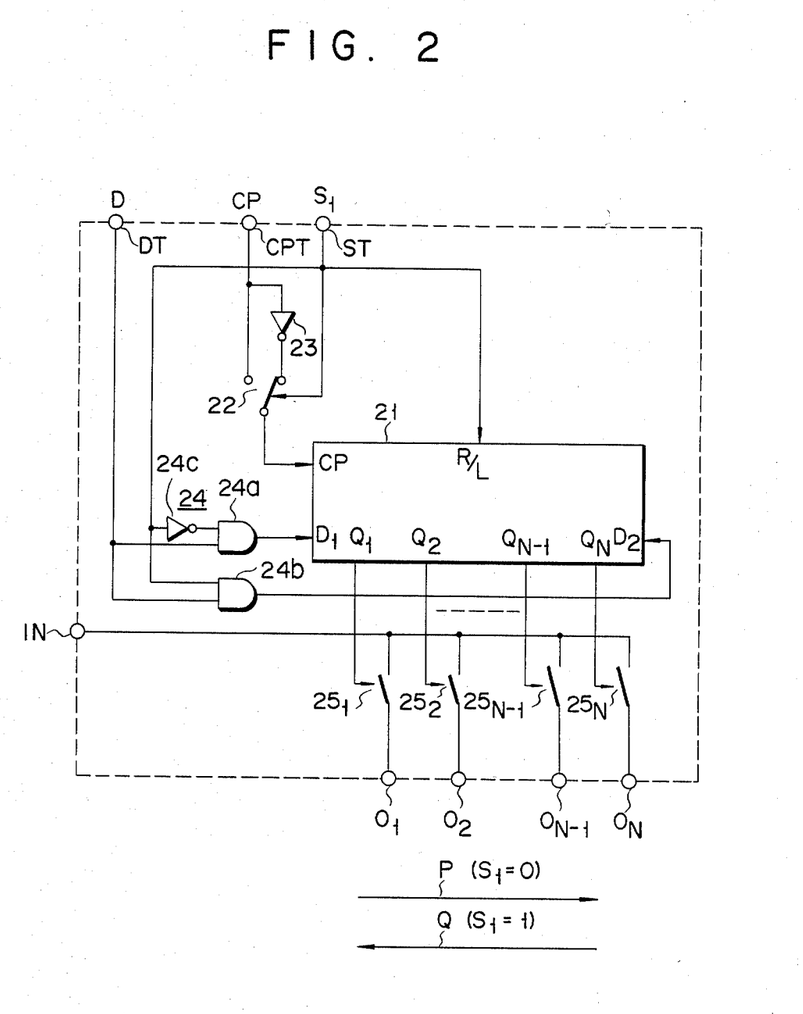
FIG. 2 shows the construction of a drive circuit of the display device of FIG. 1.

In FIG. 2, reference numeral 21 designates an N-stage bidirectional shift register. The data shifting direction of shift register 21 depends upon the voltage level of a control signal $S_1$ applied to control signal input terminal ST. Clock pulses CP applied to input terminal CPT are applied to shift register 21 directly or through an inverter 23 by a switch 22 which is switched by control signal $S_1$. A data pulse D is applied to shift register 21 through data input terminal DT for each operation of data shifting through N stages. Specifically, the data pulse D is applied through a logic circuit 24 to a first-stage side data input $D_1$ or N-th stage side data input $D_2$ according to the shifting direction determined by control signal $S_1$. The data pulse D applied to shift register 21 is shifted in the direction determined by control signal $S_1$, and from stage outputs $Q_1$ to $Q_N$ are sequentially derived scanning pulses of a logical "1" level in the sequence of from $Q_1$ to $Q_N$ or from $Q_N$ to $Q_1$.

Logic circuit 24 comprises, as shown in FIG. 2, AND gates 24a, 24b, and an inverter 24c. When control signal $S_1$ is at a logical "1" level, data D is applied to data input $D_2$, while when control signal $S_1$ is at a logical "0" level, data D is applied to data input $D_1$.

Outputs $Q_1$ to $Q_N$ of shift register 21 are coupled as control inputs to switching elements $25_1$ to $25_N$, respectively. Thus, these switching elements are sequentially turned ON. Switching elements $25_1$ to $25_N$ are commonly connected at their ends to picture-signal input terminal IN and are also connected at the other ends to output terminals $O_1$ to $O_N$, respectively. Accordingly, a video signal applied to input terminal IN is divided by switching elements $25_1$ to $25_N$ in a time division manner, and thus the sampled video signals are sequentially taken from output terminals $O_1$ to $O_N$.

It is assumed that shift register 21 is constructed so that the data shifting direction is to the right as designated by an arrow P when control signal $S_1$ applied to control terminal ST is "0" and the data shifting direction is to the left as designated by an arrow Q when control signal $S_1$ is "1". Accordingly, when control signal $S_1$ is "0", AND gate 24a is enabled. Thus, data pulse D is applied to first-stage side input $D_1$. On the other hand, when control signal $S_1$ is "1", AND gate 24b is enabled. Thus, data pulse D is applied to final-stage side input $D_2$. It is assumed that shift register 21 is arranged to shift data at the rise of the applied clock pulses. The clock pulses applied to clock pulse input terminal CP are applied directly to shift register 21 when control signal $S_1$ is "0". On the other hand, the clock pulse is applied through inverter 23 to shift register 21 when control signal $S_1$ is "1". Therefore, when control signal $S_1$ is "0", the picture data is obtained at output terminals $O_1$ to $O_N$ at the times of the rise of clock pulses CP at clock pulse input terminal CPT. On the other hand, when control signal $S_1$ is "1", the picture data is obtained at output terminals $O_1$ to $O_N$ at the times of the fall of clock pulses CP at clock pulse input terminal CPT.

As shown in FIG. 1, video signal input terminal IN, data pulse input terminal DT and clock pulse input terminal CPT of drive circuits 11 and 12 are connected to common picture signal input terminal 13, data pulse input terminal 14 and clock pulse input terminal 15, respectively. Control signal input terminal ST is connected to individual control signal input terminals 16 and 17. Control signals $S_{11}$ and $S_{12}$ of different levels are applied to control signal input terminals 16 and 17, respectively.

In the embodiment described above, $S_{11}=0$ and $S_{12}=1$. Accordingly, drive circuit 11 distributes the picture data in the order from $O_1$ to $O_N$, as shown by arrow P, to odd-numbered data lines $D_1, D_3, \ldots$, and $D_{2N-1}$. Drive circuit 12, on the other hand, distributes the picture data in the order from $O_N$ to $O_1$, as shown by arrow Q, to even-numbered data lines $D_2, D_4, \ldots, D_{2N}$. It is noted that, since the shift register of drive circuit 11 effects shifting operation at the time of the rise of clock pulses CP applied to terminal 15, while the shift register of drive circuit 12 effects shifting operation at the time of the fall of clock pulses CP, data lines $D_1, D_2, \ldots, D_{2N-1}$, and $D_{2N}$ are sequentially driven.

Figure 3:
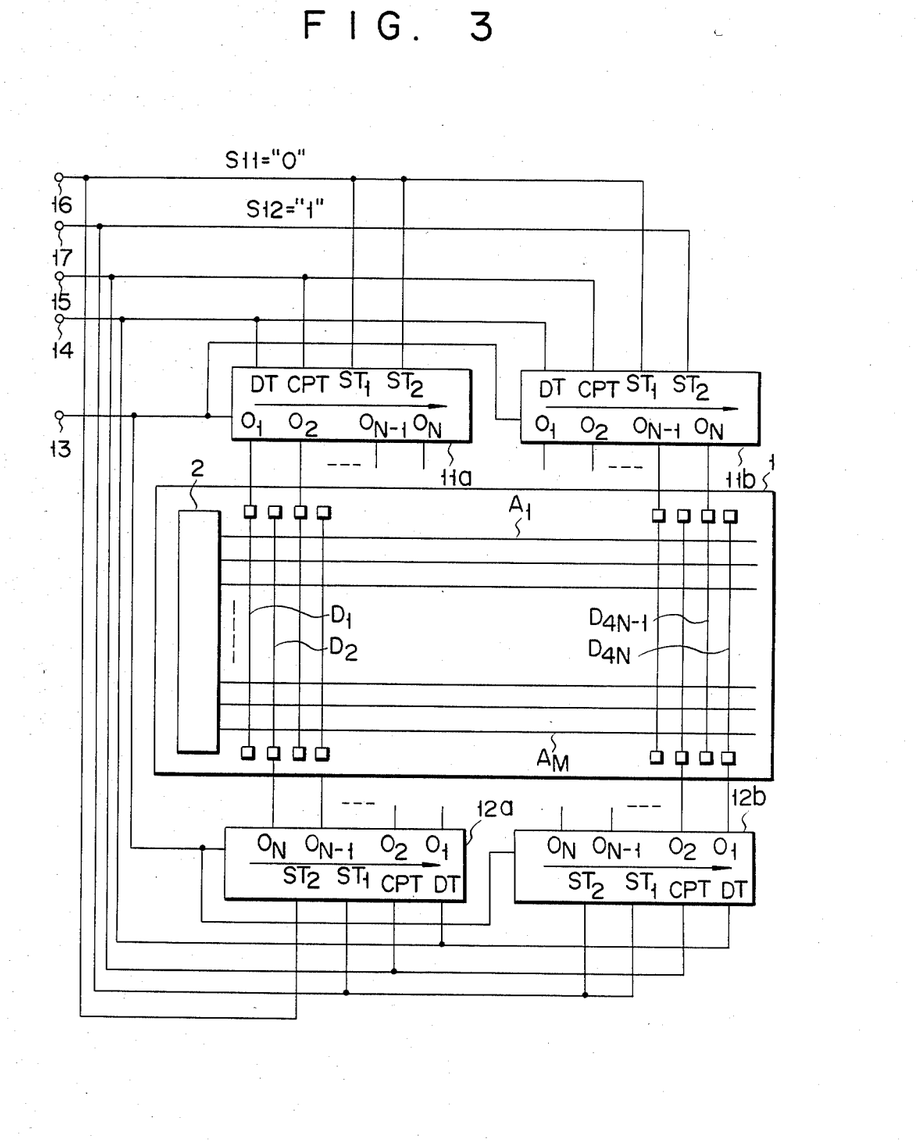
FIG. 3 schematically shows a display device according to another embodiment of the present invention.

FIG. 3 shows another embodiment of the present invention. This embodiment becomes effective in the case that the area of display panel 1 is increased, and the number of data lines are equally increased. Namely, 4N data lines $D_1$ to $D_{4N}$ are provided, a pair of drive circuits 11a and 11b each having N outputs for the odd-numbered data lines are provided at one side, and a pair of drive circuits 12a and 12b each having N outputs for the even-numbered data lines are provided at the other side. The outputs $O_1$ to $O_N$ of drive circuits 11a and 11b are respectively connected to the left- and right-hand halves of odd-numbered data lines $D_1, D_3, \ldots, D_{4N-1}$. On the other hand, outputs $O_N$ to $O_1$ of drive circuits 12a and 12b are respectively connected to the left- and right-hand halves of even-numbered data lines $D_2, D_4, \ldots,$ and $D_{4N}$.

Drive circuits 11a, 11b, 12a and 12b are each fundamentally constructed the same as the structure shown in FIG. 2, and have second control terminal $ST_2$ which receives a second control signal $S_2$. Namely, each of the drive circuits has its starting point of time of distribution of the picture data in accordance with the level of control signal $S_2$ applied to terminal $ST_2$. In other words, the data distribution period of each of the drive circuits is set to either first half period or latter half period of one horizontal scanning period in accordance with the level of control signal $S_2$.

Figure 4:
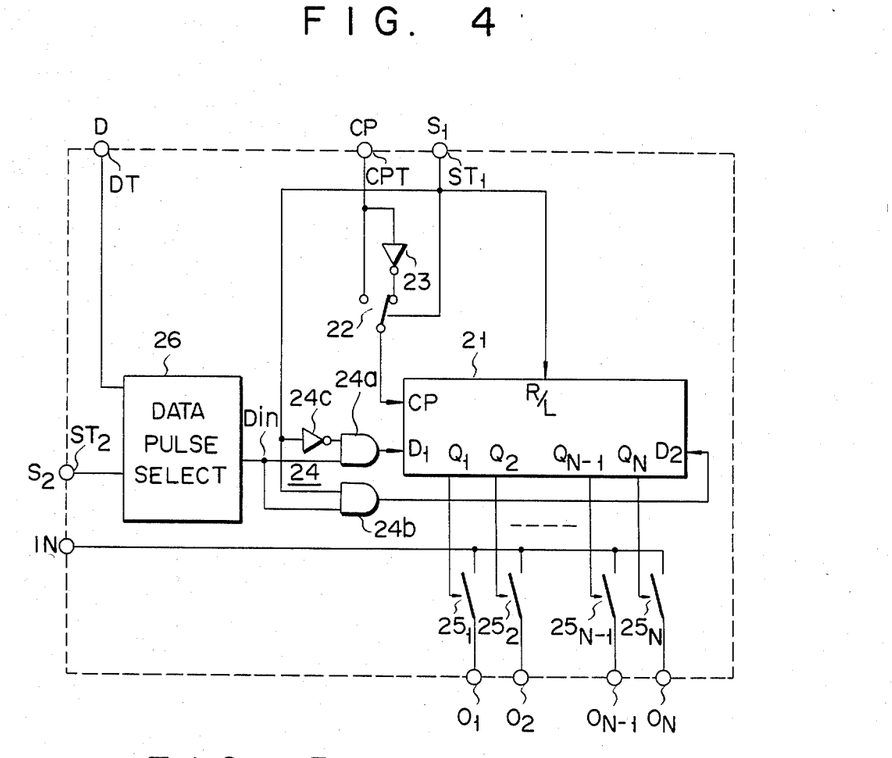
FIG. 4 shows an arrangement of the drive circuit of FIG. 3.

FIG. 4 shows an arrangement of drive circuits 11a, 11b, 12a and 12b of FIG. 3, wherein like reference numerals are used to designate like parts of FIG. 2. Between data input terminal DT and logic circuit 24 is connected a data pulse selecting circuit 26 for selecting a data pulse to be applied to shift register 21 from a pulse train shown in FIG. 6(A) in accordance with control signal $S_2$ applied to control terminal $ST_2$. Data pulse selecting circuit 26 may be arranged, for example, as shown in FIG. 5.

Figure 5:
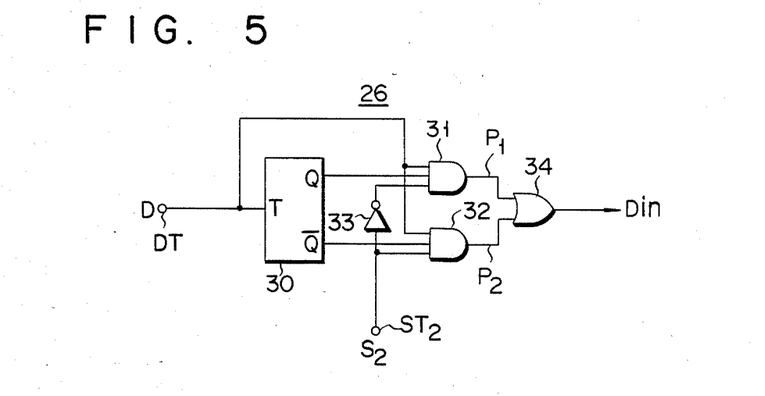
FIG. 5 shows an arrangement of the data pulse selecting circuit of the drive circuit of FIG. 4.

As shown in FIG. 5, the data input terminal DT is connected to the input of a T flip-flop circuit 30. The outputs Q and $\overline{Q}$ of T flip-flop circuit 30 are respectively connected to AND gates 31 and 32 together with input terminal DT. Control input terminal $ST_2$ is connected through an inverter 33 to AND gate 31 and directly to AND gate 32. The outputs of AND gates 31 and 32 are connected through an OR gate 34 to logic circuit 24.

Figure 6:
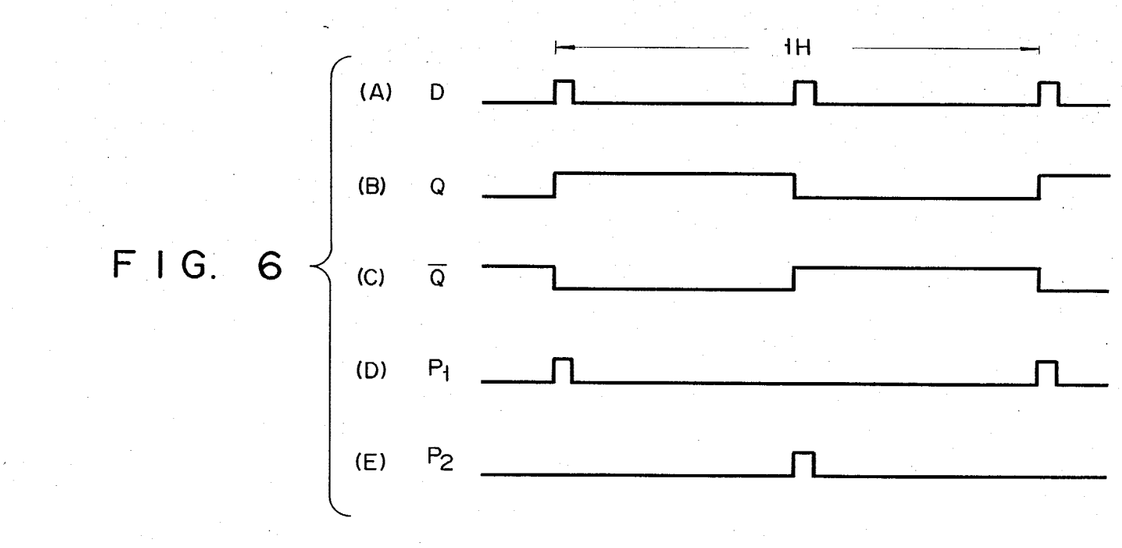
FIG. 6 shows a waveform diagram for explanation of the operation of the drive circuit of FIG. 4.

A signal D applied to data input terminal DT has, as shown in FIG. 6(A), data pulses at the start points of the first and latter halves of one horizontal scanning period. Accordingly, the output Q of T flip-flop circuit 30 goes high during the first half period of one horizontal scanning period, as shown in FIG. 6(B), while the output $\overline{Q}$ goes high during the latter half period, as shown in FIG. 6(C). When the level of control signal $S_2$ applied to control terminal $ST_2$ is "0", AND gate 31 is enabled, and AND gate 32 is disabled. Accordingly, in this case, a pulse output $P_1$ representing the start of the first half of one horizontal scanning period can be obtained from AND gate 31, as shown in FIG. 6(D). On the other hand, when the level of control signal is "1", AND gate 31 is disabled, and AND gate 32 is enabled, with the result that a pulse output $P_2$ representing the start of the latter half of one horizontal scanning period can be obtained from AND gate 32, as shown in FIG. 6(E).

Therefore, as shown in FIG. 3, a control signal $S_{11}$ of logic "0" is applied to second control terminals $ST_2$ of drive circuits 11a, 12a and a control signal $S_{12}$ of logic "1" is applied to second control terminal $ST_2$ of drive circuits 11b, 12b, then drive circuits 11a and 12a distribute the picture data to the data lines during the first half period of one horizontal scanning period, while drive circuits 11b and 12b distribute the picture data to the data lines during the latter half period of one horizontal scanning period.

In the embodiment shown in FIG. 3, clock pulses are applied to drive circuits 11a, 11b, 12a and 12b even during a period that the distribution of picture data is not performed, resulting in excessive power consumption.

An embodiment of the drive circuit (scanning pulse generating circuit) which is improved for eliminating excessive power consumption will now be described. This embodiment is constructed such that a shift register which generates a series of scanning pulses is divided into a plurality of blocks and clock pulses are applied to these shift register blocks only during the scanning pulse generating period (picture data distributing duration).

Figure 7:
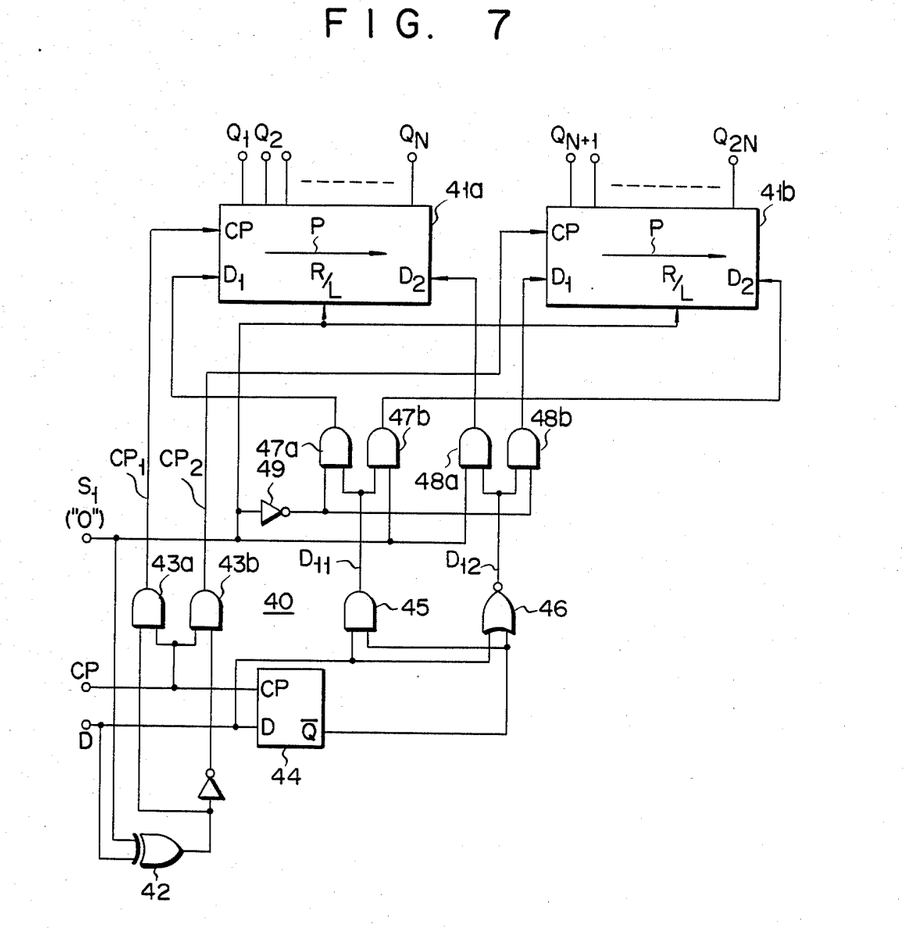
FIG. 7 shows still another embodiment of the drive circuit of the present invention.

The embodiment of FIG. 7 comprises two bidirectional shift register blocks 41a and 41b. In this embodiment, a control signal $S_1$ is "0", and accordingly shift registers 41a and 41b perform a rightward shifting operation as shown by an arrow P. The data pulse D applied to a control circuit 40 is "1" during the first half period of one horizontal scanning period, and is "0" during the latter half period. Thus, the pulse D has a duty factor of ½.

Figure 8:
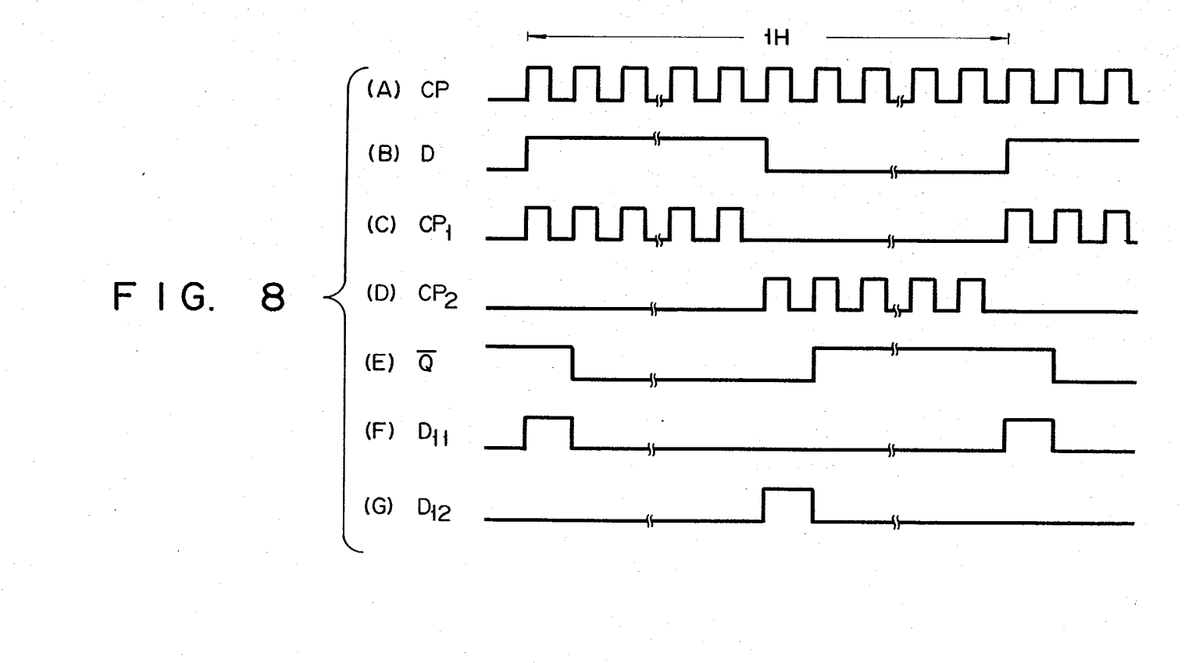
FIG. 8 is a waveform diagram for explanation of the operation of the drive circuit of FIG. 7.

The output of an Exclusive-OR circuit 42, to which a control signal $S_1$ and data pulse D are applied, becomes "1" during the first half of one horizontal scanning period, and becomes "0" during the latter half. Clock pulses CP as shown in FIG. 8(A) are applied to AND gates 43a and 43b. AND gates 43a and 43b are respectively enabled and disabled by the output of Exclusive-OR circuit 42 during the first half of one horizontal scanning period, while are respectively disabled and enabled during the latter half of one horizontal scanning period. Accordingly, clock pulses $CP_1$ are supplied through AND gate 43a to shift register 41a during the first half period of one horizontal scanning period, as shown in FIG. 8(C), while clock pulses $CP_2$ are supplied through AND gate 43 to shift register 41b during the latter half period of one horizontal scanning period, as shown in FIG. 8(D).

The clock pulses CP and the data pulse D are applied to D flip-flop 44, with the result that the output $\overline{Q}$ of flip-flop 44 will vary as shown in FIG. 8(E). The data pulse D and the output $\overline{Q}$ are both supplied to an AND gate 45 and a NOR gate 46.

An output signal $D_{11}$ which becomes "1" at the start of one horizontal scanning period, as shown in FIG. 8(F), can be obtained at the output of AND gate 45, while an output signal $D_{12}$ which becomes "1" at the start of the latter half of one horizontal scanning period, as shown in FIG. 8(G), can be obtained at the output of NOR gate 46. The output signal $D_{11}$ of AND gate 45 is applied to AND gates 47a and 47b, while the output signal $D_{12}$ of NOR gate 46 is applied to AND gates 48a and 48b. The control signal $S_1$ is applied directly to AND gates 47b and 48a and is also applied through an inverter 49 to AND gates 47a and 48b. Accordingly, in this embodiment, since $S_1=1$, AND gates 47a, 48b are enabled to apply data signals $D_{11}$ and $D_{12}$ to inputs $D_1$ of shift registers 41a and 41b, respectively. Accordingly, shift register 41a sequentially supplies scanning pulses to outputs $Q_1$ to $Q_N$ during the first half period of one horizontal scanning period, while shift register 41b sequentially supplies scanning pulses to the outputs $Q_{N+1}, Q_{N+2}, \ldots, Q_{2N}$ during the latter half period of one horizontal scanning period. As evident from the aforementioned description, since shift registers 41a and 41b receive clock pulses during the first and latter halves of one horizontal scanning period, respectively, excessive power consumption can be suppressed.

When the control signal $S_1$ is "1", AND gates 47b and 48a are enabled, while AND gates 47a and 48b are disabled. Accordingly, data signals $D_{11}$ and $D_{12}$ are respectively applied to data inputs $D_2$ of shift registers 41b and 41a, and scanning pulses can be obtained in the sequence from $Q_{2N}$ to $Q_1$.

Though, in the embodiment shown in FIG. 7, the bidirectional shift registers are employed, the teaching of the embodiment in FIG. 7 can also be applied to a scanning pulse generating circuit which employs unidirectional shift registers. Further, the number of blocks of shift registers are not limited to two, but may also be divided into more than three blocks.

Figure 9:
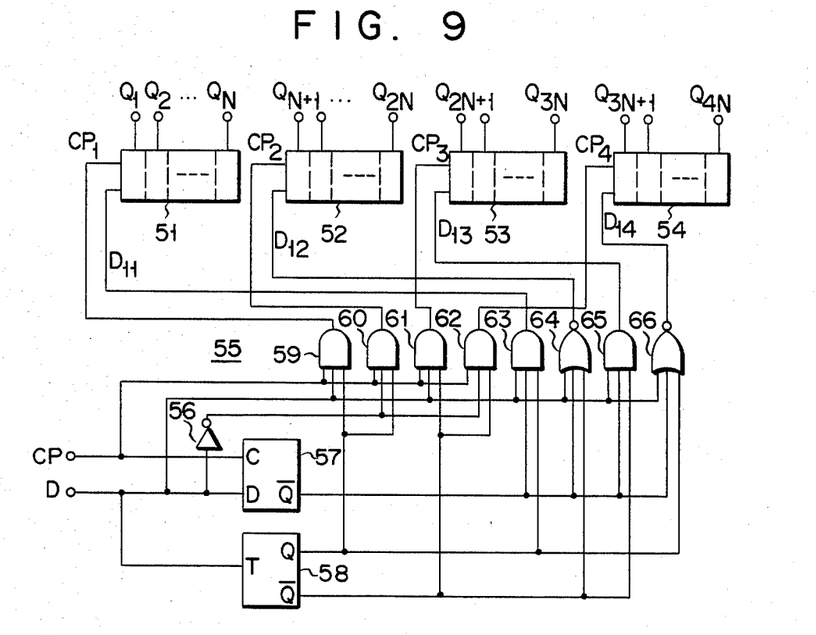
FIG. 9 shows still another embodiment of the drive circuit.
Figure 10:
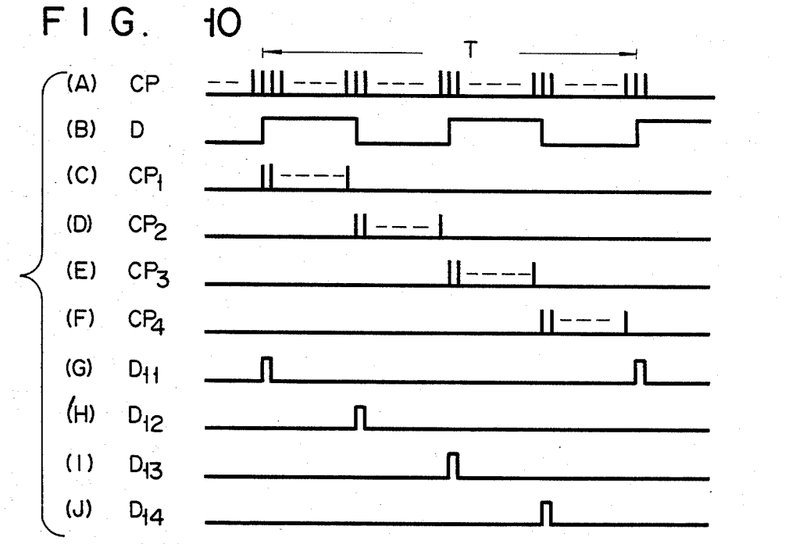
FIG. 10 is a waveform diagram for explanation of the operation of the drive circuit of FIG. 9.

FIG. 9 shows still another embodiment of the present invention in which a unidirectional shift register is divided into four blocks. Shift registers 51 to 54 each have N outputs. A control circuit 55 for distributing clock pulses and a data signal to each of the blocks comprises, as shown in FIG. 9, an inverter 56, a shift register 57, a T flip-flop 58, AND gates 59 to 63, 65 and NOR gates 64 and 66. Control circuit 55 is responsive to clock pulses CP shown in FIG. 10(A) and a data pulse D having a period T/2 one half the one horizontal scanning period T and a duty factor of ½ as shown in FIG. 10(B) to apply clock pulses $CP_1$ to $CP_4$ (FIG. 10(A) to FIG. 10(F)) sequentially to blocks 51 to 54 during a period of T/4 and data signals $D_{11}$ to $D_{14}$ sequentially to the blocks at the start of shift operation.

When the shift register is divided into four blocks as shown in FIG. 9, the power consumption becomes ¼ of that when it is not divided. The power consumption of the control circuit can be ignored when many stages are provided in the shift register.

The present invention has been described in connection with the drive circuit for distributing picture data to the data lines, but may also be applied to a vertical scanning drive circuit. Further, the present invention may also be applied, in addition to the liquid crystal display device, for a display device which employs display elements such as light-emitting diodes (LED).

What we claim is:

1. A display device comprising:
    a display panel having address lines and data lines, and display elements connected to said address lines and data lines in a matrix form, said address lines being connected to successively receive scanning pulses, and said data lines being connected to successively receive picture data signals and divided into odd-numbered data lines and even-numbered data lines each having upper and lower ends; and
    first and second driver circuit means respectively arranged on upper and lower sides of said display panel along the direction of said data lines for successively applying the picture data signals to said data lines of said display panel during a scanning period, said first and second driver circuit means having an identical integrated-circuit configuration and each having outputs arranged in an order, said outputs of said first driver circuit being coupled to said upper ends of said odd-numbered data lines, respectively, and said outputs of said second driver circuit being coupled to said lower ends of said even-numbered data lines, respectively, in an opposite order to that of connection of said outputs of said first driver circuit means to said odd-numbered data lines, said first and second driver circuit means each having a control signal input, a clock pulse input, a scanning start pulse input, and a picture signal input respectively connected to receive control signals with different logic levels, common clock pulses, common scanning start pulses, and common picture signals, said first and second driver circuit means capable of scanning in opposite directions in relation to the respective order of outputs thereof and being responsive to said control signals, which selectively control a scanning direction of said first and second driver circuit means, and said scanning start pulse to successively output said picture signals to said outputs thereof in opposite scanning directions relative to each other in synchronism with said clock pulses such that said data lines of said display panel are successively supplied with said picture signals in one direction of said display panel during the scanning period.

2. A display device according to claim 1, wherein each of said first and second driver circuit means comprises;
a bidirectional shift register arranged to shift input data in synchronism with said clock pulses, and having a first data input for receiving data to be shifted right and a second data input for receiving data to be shifted left, said shift register being responsive to said control signal to change the direction of data shifting depending on a logical level of said control signal applied to said control signal input;

means responsive to said control signal for applying said scanning start pulse to one of said first and second data inputs in accordance with the logic level of said control signal; and means responsive to said control signal for changing the polarity of said clock pulses to be applied to said bidirectional shift register to shift said scanning start pulse therein in accordance with the logic level of said control signal.

3. A display device according to claim 2, further comprising:
a plurality of switching elements coupled between said picture signal input and said outputs of each of said first and second driver circuit means, said switching elements successively enabled by said bidirectional shift register to successively apply the picture signals to said data lines of said display panel.

4. A display device according to claim 1, wherein each of said first and second driver circuit means comprises:
a plurality of circuit blocks which are connected to receive said clock pulses and arranged to successively apply the picture signals to corresponding ones of said data lines of said display panel in successive periods within the scanning period for said data lines of said display panel.

5. A display device according to claim 4, further comprising:
means for applying said clock pulses to each of said circuit blocks only during a corresponding one of the successive periods.

* * * * *